US010294436B2

(12) United States Patent
Orlebar et al.

(10) Patent No.: US 10,294,436 B2
(45) Date of Patent: May 21, 2019

(54) FUEL COMPOSITION

(71) Applicant: SHELL OIL COMPANY, Houston, TX (US)

(72) Inventors: Caroline Nicola Orlebar, London (GB); Glenn John Wilson, Ince (GB)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/525,650

(22) PCT Filed: Nov. 10, 2015

(86) PCT No.: PCT/EP2015/076255
§ 371 (c)(1),
(2) Date: May 10, 2017

(87) PCT Pub. No.: WO2016/075166
PCT Pub. Date: May 19, 2016

(65) Prior Publication Data

US 2017/0321136 A1 Nov. 9, 2017

(30) Foreign Application Priority Data

Nov. 12, 2014 (EP) .................................... 14192923

(51) Int. Cl.
*B60K 6/20* (2007.10)
*C10L 1/16* (2006.01)
(Continued)

(52) U.S. Cl.
CPC ........... *C10L 1/1616* (2013.01); *B60W 10/06* (2013.01); *C10L 1/06* (2013.01); *C10L 10/10* (2013.01); *F02P 9/002* (2013.01); *B60Y 2200/92* (2013.01); *C10G 2300/1022* (2013.01); *C10G 2300/1044* (2013.01);
(Continued)

(58) Field of Classification Search
CPC ................................................ B60Y 2200/92
See application file for complete search history.

(56) References Cited

U.S. PATENT DOCUMENTS 4,125,566 A 11/1978 Trin et al.
4,478,955 A 10/1984 Pesa et al.
(Continued)

FOREIGN PATENT DOCUMENTS

DE 3826608 A1 2/1990
DE 3838918 A1 5/1990
(Continued)

OTHER PUBLICATIONS

Van Der Burgt et al., "The Shell Middle Distillate Synthesis Process", 5th Synfuels Worldwide Symposium, Washington DC, Nov. 1985.

(Continued)

*Primary Examiner* — Hieu T Vo
*Assistant Examiner* — Arnold Castro
(74) *Attorney, Agent, or Firm* — Shell Oil Company

(57) ABSTRACT

Use of a liquid fuel composition comprising (a) a gasoline base fuel and (b) from 0.5 to 50% v/v of naphtha as a fuel for a spark ignition internal combustion engine, wherein the spark ignition internal combustion engine is comprised within the powertrain of a hybrid electric vehicle.

10 Claims, 1 Drawing Sheet

(51) Int. Cl.

| | |
|---|---|
| ***B60W 10/06*** | (2006.01) |
| ***C10L 1/06*** | (2006.01) |
| ***C10L 10/10*** | (2006.01) |
| ***F02P 9/00*** | (2006.01) |

(52) U.S. Cl.

CPC .................. *C10G 2300/305* (2013.01); *C10L 2200/0423* (2013.01); *C10L 2200/0492* (2013.01); *C10L 2230/22* (2013.01); *C10L 2270/023* (2013.01)

(56) References Cited

U.S. PATENT DOCUMENTS

| | | | | |
|---|---|---|---|---|
| 4,849,572 | A | 7/1989 | Chen et al. | |
| 4,877,416 | A | 10/1989 | Campbell | |
| 4,943,672 | A | 7/1990 | Hamner et al. | |
| 5,059,299 | A | 10/1991 | Cody et al. | |
| 5,855,629 | A | 1/1999 | Grundy et al. | |
| 6,204,426 | B1 | 3/2001 | Miller et al. | |
| 8,518,130 | B2 | 8/2013 | Croft et al. | |
| 8,571,739 | B2 * | 10/2013 | Fleckner | B60K 6/485 701/22 |
| 2009/0192660 | A1 * | 7/2009 | Tamor | B60L 15/2045 701/22 |
| 2009/0193711 | A1 * | 8/2009 | Clark | C10L 1/023 44/451 |

FOREIGN PATENT DOCUMENTS

| | | | |
|---|---|---|---|
| DE | 4142241 | A1 | 6/1993 |
| DE | 4309074 | A1 | 9/1994 |
| DE | 19620262 | A1 | 11/1997 |
| DE | 10102913 | A1 | 7/2002 |
| EP | 0147873 | A1 | 7/1985 |
| EP | 0310875 | A1 | 4/1989 |
| EP | 0356725 | A1 | 3/1990 |
| EP | 0452328 | A1 | 10/1991 |
| EP | 0548617 | A2 | 6/1993 |
| EP | 0583836 | A1 | 2/1994 |
| EP | 0668342 | A1 | 8/1995 |
| EP | 0700985 | A1 | 3/1996 |
| EP | 0776959 | A2 | 6/1997 |
| EP | 0831141 | A1 | 3/1998 |
| EP | 1101813 | A1 | 5/2001 |
| EP | 1371715 | A1 | 12/2003 |
| EP | 2107101 | A2 | 10/2009 |
| GB | 2077289 | B | 6/1983 |
| WO | 9424231 | A1 | 10/1994 |
| WO | 9703946 | A1 | 2/1997 |
| WO | 9714768 | A1 | 4/1997 |
| WO | 9714769 | A1 | 4/1997 |
| WO | 9920720 | A1 | 4/1999 |
| WO | 9934917 | A1 | 7/1999 |
| WO | 0011116 | A1 | 3/2000 |
| WO | 0011117 | A1 | 3/2000 |
| WO | 0020534 | A1 | 4/2000 |
| WO | 0020535 | A1 | 4/2000 |
| WO | 0183406 | A2 | 11/2001 |
| WO | 0183641 | A2 | 11/2001 |
| WO | 0183647 | A2 | 11/2001 |
| WO | 0183648 | A2 | 11/2001 |
| WO | 03076554 | A1 | 9/2003 |
| WO | 2009050287 | A1 | 4/2009 |
| WO | 2009077606 | A2 | 6/2009 |
| WO | 2010000761 | A1 | 1/2010 |
| WO | 2010028206 | A1 | 3/2010 |

OTHER PUBLICATIONS

Sagarin, et al., Cosmetics Science and Technology, Chapter VIII, 1972, pp. 189 et. seq.

International Search Report and Written Opinion received for PCT Patent Application No. PCT/EP2015/076255, dated Feb. 12, 2016, 8 pages.

* cited by examiner

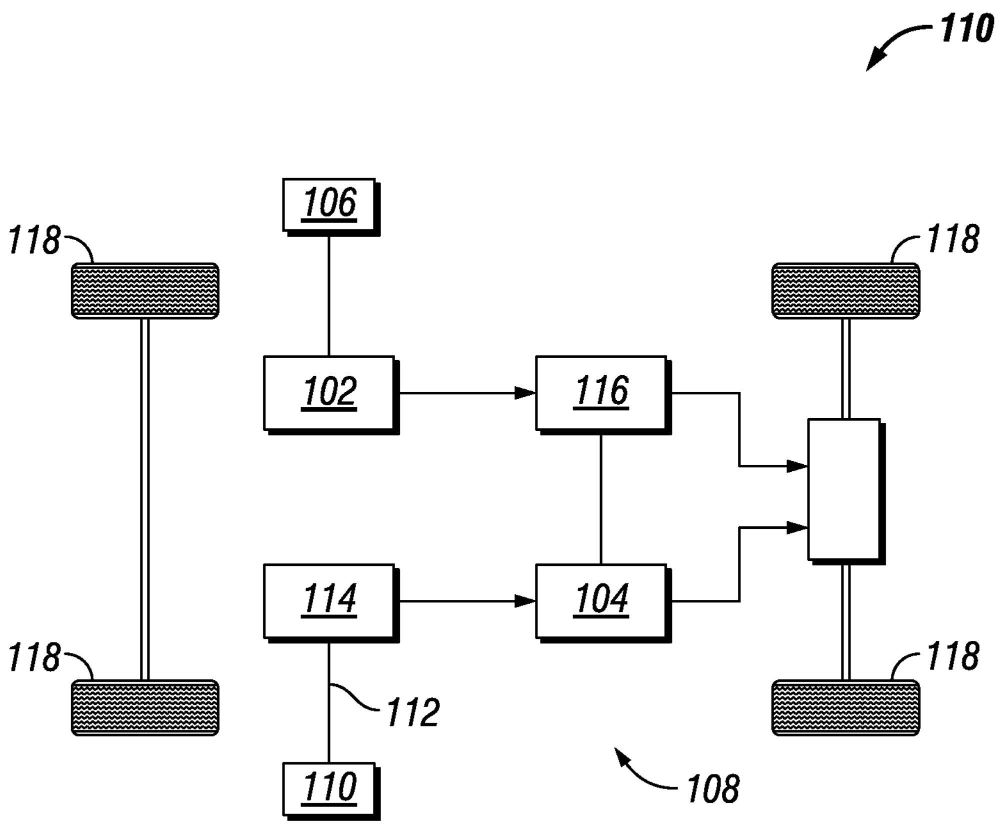
110
106
118
118
102
116
114
104
118
118
112
110
108

FUEL COMPOSITION

PRIORITY CLAIM

The present application is the National Stage (§ 371) of International Application No. PCT/EP2015/076255, filed Nov. 10, 2015, which claims priority from European Patent Application No. 14192923.2, filed Nov. 12, 2014 incorporated herein by reference.

FIELD OF THE INVENTION

The invention is in the field of fuel formulations, particularly gasoline-type fuel formulations.

BACKGROUND OF THE INVENTION

The rising costs of hydrocarbon-based fuels and increasing concern about the environmental effects of carbon dioxide emissions have resulted in a growing demand for motor vehicles that operate either partly or entirely on electrical energy.

Hybrid Electric Vehicles (HEV) make use of both electrical energy stored in re-chargeable batteries and the mechanical energy converted from fuel, usually hydrocarbon based, by a conventional internal combustion engine (ICE). The batteries are charged during driving operation by the ICE and also by recovering kinetic energy during deceleration and braking. This process is offered by a number of vehicle original equipment manufacturers (OEMs) for some of their vehicle models. HEVs typically provide a normal driving experience, with the principle advantage of improved fuel consumption in comparison to conventional ICE only vehicles. Plug-in Hybrid Electric Vehicles (PHEVs) have similar functionality to HEVs, but in this application the battery can also be connected to the mains electrical system for recharging when the vehicle is parked. PHEVs typically have larger battery packs than HEV which affords some all-electric range capability. Dynamic driving will use electric power and ICE, though the area of operation using an internal combustion engine (ICE) for propulsion may be restricted to cruising and intercity driving. Consequently the fuel appetite of vehicles may well be different from that required currently for conventional ICE or HEV equipped vehicles. For vehicles based exclusively in an urban environment, the increased EV mode capacity and plug-in charging function further reduce the level of ICE activity. This can lead to significantly extended residence time for the fuel tank contents compared to HEV and conventional ICE vehicles.

Conventional ICE vehicles deliver about 600 km (400 miles) range for a propulsion system weight of about 200 kg and require a re-fill time of around 2 minutes. In comparison, it is considered that a battery pack based on current LiON technology that could offer comparable range and useful battery life would weigh about 1700 kg. The additional weight of the motor, power electronics and vehicle chassis would result in a much heavier vehicle than the conventional ICE equivalent.

In a conventional ICE vehicle, the engine torque and power delivery from the engine must cover the full range of vehicle operating dynamics. However, the thermodynamic efficiency of an internal combustion engine cannot be fully optimised across a wide range of operating conditions. The ICE has a relatively narrow dynamic range. Hence a major challenge for the vehicle manufacturers (OEMs) is to develop engine technologies and transmission systems that allow the engine torque and power delivery from the engine to operate over the full range of vehicle operating dynamics. Electrical machines on the other hand can be designed to have a very wide dynamic range, e.g., are able to deliver maximum torque at zero speed. This control flexibility is well recognised as a useful feature in industrial drive applications and offers potential in automotive applications. Within their operating envelope, electrical machines can be controlled using sophisticated electronics to give very smooth torque delivery, tailored to the demand requirements. However it may be possible to provide different torque delivery profiles that are more appealing to drivers. Hence this is likely to be an area of interest going forward for automotive designers. At higher speeds, electrical drive systems tend to be limited by the heat rejection capacity of the power electronics and the cooling system for the electric motor itself. Additional considerations for high torque motors at high speeds are associated with the mass of the rotating components, where very high centrifugal forces can be produced at high speeds. These can be destructive. In HEVs and PHEVs, the electric motor is therefore able to provide only some of the dynamic range. However, this can allow the efficiency of the ICE to be optimised over a narrower range of operation. This offers some advantages in terms of engine design.

Hence, current hydrocarbon fuels developed for a full range ICE may not be optimised or indeed beneficial for HEV or PHEV ICE units. Fuels have been formulated and regulated for conventional ICE vehicles for many years and may therefore be considered to have stabilised, with degrees of freedom in the formulation space well understood. The relatively recent introduction of hybrid technology presents an opportunity to consider the fuel formulation space from an entirely new perspective.

SUMMARY OF THE INVENTION

According to a first aspect of the invention there is provided the use of a liquid fuel composition comprising (a) a gasoline base fuel and (b) from 0.5 to 50% v/v of naphtha as a fuel for a spark ignition internal combustion engine, wherein the spark ignition internal combustion engine is comprised within the powertrain of a hybrid electric vehicle.

It has surprisingly been found that the liquid fuel composition of the present invention provides improved fuel consumption in a spark ignition internal combustion engine, particularly where the spark ignition internal combustion engine is comprised within the powertrain of a hybrid electric vehicle, especially a plug-in hybrid electric vehicle.

In a second aspect of the present invention there is provided the use of a liquid fuel composition comprising (a) a gasoline base fuel and (b) from 0.5 to 50% v/v of naphtha for improving fuel consumption in a spark ignition internal combustion engine. Suitably, the spark ignition internal combustion engine is comprised within the powertrain of a hybrid electric vehicle, or optionally a plug-in hybrid electric vehicle.

In a third aspect of the present invention there is provided a method of operating a spark ignition internal combustion engine wherein the spark ignition internal combustion engine is comprised within the powertrain of a hybrid electric vehicle, in particular a plug-in hybrid electric vehicle, comprising operating the internal combustion engine using a liquid fuel composition comprising (a) a gasoline base fuel and (b) from 0.5 to 50% v/v of naphtha.

In a fourth aspect of the present invention there is provided a method of improving the fuel consumption in a spark ignition internal combustion engine comprising operating the internal combustion engine using a liquid fuel composition comprising (a) a gasoline base fuel and (b) from 0.5 to 50% v/v of naphtha. Suitably, the spark ignition internal combustion engine is comprised within the powertrain of a hybrid electric vehicle, or optionally a plug-in hybrid electric vehicle.

In the present invention, it is preferred that the naphtha is Fischer-Tropsch derived naphtha.

DETAILED DESCRIPTION OF THE INVENTION

In order to assist with the understanding of the invention several terms are defined herein.

According to the present invention there is provided a method of improving the fuel consumption in a spark ignition internal combustion engine using a liquid fuel composition comprising (a) a gasoline base fuel and (b) from 0.5 to 50% v/v of naphtha, preferably wherein the spark ignition internal combustion engine is comprised within the powertrain of a hybrid electric vehicle. There is further provided the use of a liquid fuel composition comprising (a) a gasoline base fuel and (b) from 0.5 to 50% v/v of naphtha for improving fuel consumption in a spark ignition internal combustion engine. In the context of these aspects of the present invention, the term "improving" embraces any degree of improvement in fuel consumption. Any improvement in this context refers to a reduction in fuel consumption and may for instance be a reduction in fuel consumption of 0.05% or more, preferably 0.1% or more, more preferably 0.2% or more, even more preferably 0.5% or more, especially 1% or more, more especially 2% or more, even more especially 5% or more, and in particular 10% or more, compared to the fuel consumption of an analogous fuel formulation, prior to adding from 0.5 to 50% v/v of naphtha to it in accordance with the present invention. The reduction in fuel consumption may be at most a 15% reduction in fuel consumption compared to an analogous fuel formulation, prior to adding from 0.5 to 50% v/v of naphtha to it in accordance with the present invention.

In accordance with the present invention, the fuel consumption provided by a fuel composition may be determined in any known manner, for instance, using the carbon balance method or the Coriolis fuel flow method.

However, it should be appreciated that any measurable improvement in fuel consumption may provide a worthwhile advantage, depending on what other factors are considered important, e.g., availability, cost, safety and so on.

The present invention also provides benefits in terms of power output.

The term "power output" as used herein refers to the amount of resistance power required to maintain a fixed speed at wide open throttle conditions in Chassis Dynamometer testing.

According to the present invention there is provided a method of improving the power output in a spark ignition internal combustion engine using a liquid fuel composition comprising (a) a gasoline base fuel and (b) from 0.5 to 50% v/v of naphtha, preferably wherein the spark ignition internal combustion engine is comprised within the powertrain of a hybrid electric vehicle. In the context of this aspect of the invention, the term "improving" embraces any degree of improvement. The improvement may for instance be 0.05% or more, preferably 1% or more, more preferably 2% or more, even more preferably 5% or more, especially 10% or more, more especially 15% or more, even more especially 20% or more, in particular 30% or more, of the power output of an analogous fuel formulation, prior to adding 0.5 to 50% v/v of naphtha to it in accordance with the present invention. The improvement in power output may be at most 40% of the power output of an analogous fuel formulation, prior to adding 0.5 to 50% v/v of naphtha to it in accordance with the present invention.

In accordance with the present invention, the power output provided by a fuel composition may be determined in any known manner.

In accordance with the present invention, the power output provided by a fuel composition may be determined in any known manner for instance using the standard test methods as set out in SAE Paper 2005-01-0239 and SAE Paper 2005-01-0244.

The liquid fuel composition of the present invention comprises a gasoline base fuel suitable for use in an internal combustion engine and from 0.5 to 50% v/v of naphtha. Therefore the liquid fuel composition of the present invention is a gasoline composition.

The present invention provides for use of a liquid fuel composition comprising a mixture of hydrocarbons and from 0.5 to 50% v/v of naphtha as a fuel for a spark ignition internal combustion engine, wherein the spark ignition internal combustion engine is comprised within the powertrain of a hybrid electric vehicle. The term "comprises" as used herein is intended to indicate that as a minimum the recited components are included but that other components that are not specified may also be included as well.

The liquid fuel compositions herein comprise a naphtha. The person skilled in the art would know what is meant by the term "naphtha". Typically, the term "naphtha" means a mixture of hydrocarbons generally having between 5 and 12 carbon atoms and having a boiling point in the range of 30 to 200° C. Naphtha may be petroleum-derived naphtha or Fischer-Tropsch derived naphtha. The liquid fuel compositions herein comprise a naphtha which is preferably, but not limited to, a naphtha derived from the product of a Fischer-Tropsch synthesis process (a "Fischer-Tropsch derived naphtha").

By "Fischer-Tropsch derived" is meant that the naphtha is, or is derived from, a product of a Fischer-Tropsch synthesis process (or Fischer-Tropsch condensation process). A Fischer-Tropsch derived naphtha may also be referred to as a GTL (Gas-to-Liquid) naphtha.

The Fischer-Tropsch reaction converts carbon monoxide and hydrogen (synthesis gas) into longer chain, usually paraffinic, hydrocarbons:

$$n(CO+2H2)=(\text{—}CH2\text{-})n+nH2O+\text{heat},$$

in the presence of an appropriate catalyst and typically at elevated temperatures (e.g., 125 to 300° C., preferably 175 to 250° C.) and/or pressures (e.g., 5 to 100 bar, preferably 12 to 50 bar). Hydrogen:carbon monoxide ratios other than 2:1 may be employed if desired.

The carbon monoxide and hydrogen may themselves be derived from organic or inorganic, natural or synthetic sources, typically either from natural gas or from organically derived methane. The gases which are converted into synthesis gas, which are then converted into liquid fuel components using Fischer-Tropsch synthesis can in general include natural gas (methane), Liquid petroleum gas (LPG) (e.g., propane or butane), "condensates" such as ethane, and gaseous products derived from coal, biomass and other hydrocarbons.

The Fischer-Tropsch derived naphtha may be obtained directly from the Fischer-Tropsch reaction, or derived indirectly from the Fischer-Tropsch reaction, for instance by fractionation of Fischer-Tropsch synthesis products and/or by hydrotreatment of Fischer-Tropsch synthesis products. Hydrotreatment can involve hydrocracking to adjust the boiling range (see, e.g., GB-B-2077289 and EP-A-0147873) and/or hydroisomerisation which can improve cold flow properties by increasing the proportion of branched paraffins. EP-A-0583836 describes a two step hydrotreatment process in which a Fischer-Tropsch synthesis product is firstly subjected to hydroconversion under conditions such that it undergoes substantially no isomerisation or hydrocracking (this hydrogenates the olefinic and oxygen-containing components), and then at least part of the resultant product is hydroconverted under conditions such that hydrocracking and isomerisation occur to yield a substantially paraffinic hydrocarbon fuel. The desired fraction(s) may subsequently be isolated for instance by distillation.

Other post-synthesis treatments, such as polymerisation, alkylation, distillation, cracking-decarboxylation, isomerisation and hydroreforming, may be employed to modify the properties of Fischer-Tropsch condensation products, as described for instance in U.S. Pat. No. 4,125,566 and U.S. Pat. No. 4,478,955.

Typical catalysts for the Fischer-Tropsch synthesis of paraffinic hydrocarbons comprise, as the catalytically active component, a metal from Group VIII of the periodic table, in particular ruthenium, iron, cobalt or nickel. Suitable such catalysts are described for instance in EP-A-0583836 (pages 3 and 4).

An example of a Fischer-Tropsch based process is the SMDS (Shell Middle Distillate Synthesis) described by van der Burgt et al. in "The Shell Middle Distillate Synthesis Process", paper delivered at the 5th Synfuels Worldwide Symposium, Washington D.C., November 1985 (see also the November 1989 publication of the same title from Shell International Petroleum Company Ltd, London, UK). This process (also sometimes referred to as the Shell "Gas-To-Liquids" or "GTL" technology) produces middle distillate range products by conversion of a natural gas (primarily methane) derived synthesis gas into a heavy long chain hydrocarbon (paraffin) wax which can then be hydroconverted and fractionated to produce the desired product, for example Fischer-Tropsch derived naphtha or liquid transport fuels such as the gas oils useable in diesel fuel compositions. A version of the SMDS process, utilising a fixed bed reactor for the catalytic conversion step, is currently in use in Bintulu, Malaysia and its gas oil products have been blended with petroleum derived gas oils in commercially available automotive fuels.

Examples of other Fischer-Tropsch synthesis processes include the so-called commercial Slurry Phase Distillate technology of Sasol and the "AGC-21" ExxonMobil process. These and other processes are, for example, described in more detail in EP-A-776 959, EP-A-668 342, U.S. Pat. No. 4,943,672, U.S. Pat. No. 5,059,299, WO-A-99/34917 and WO-A-99/20720.

Fischer-Tropsch derived naphtha prepared by the SMDS process is commercially available for instance from Shell companies. Further examples of Fischer-Tropsch derived products are described in EP-A-0583836, EP-A-1101813, WO-A-97/14768, WO-A-97/14769, WO-A-00/20534, WO-A-00/20535, WO-A-00/11116, WO-A-00/11117, WO-A-01/83406, WO-A-01/83641, WO-A-01/83647, WO-A-01/83648 and U.S. Pat. No. 6,204,426.

By virtue of the Fischer-Tropsch process, a Fischer-Tropsch derived naphtha has essentially no, or undetectable levels of, sulphur and nitrogen. Compounds containing these heteroatoms tend to act as poisons for Fischer-Tropsch catalysts and are therefore removed from the synthesis gas feed.

Further, the Fischer-Tropsch process as usually operated produces no or virtually no aromatic components. The aromatics content of a Fischer-Tropsch derived naphtha, suitably determined by ASTM D4629, will typically be below 1% w/w, preferably below 0.5% w/w and more preferably below 0.2 or 0.1% w/w.

Generally speaking, Fischer-Tropsch derived naphthas have relatively low levels of polar components, in particular polar surfactants, for instance compared to petroleum derived naphthas. Such polar components may include for example oxygenates, and sulphur- and nitrogen-containing compounds. A low level of sulphur in a Fischer-Tropsch derived naphtha is generally indicative of low levels of both oxygenates and nitrogen containing compounds, since all are removed by the same treatment processes.

The Fischer-Tropsch derived naphtha component of the present invention is a liquid hydrocarbon distillate with a final boiling point of typically up to 220° C., preferably up to 180° C. or 175° C. Its initial boiling point is typically at least 25° C., preferably at least 30° C.

The Fischer-Tropsch derived naphtha, or the majority of the Fischer-Tropsch derived naphtha (for example, at least 95% w/w), is typically comprised of hydrocarbons having 5 or more carbon atoms.

Suitably, the Fischer-Tropsch derived naphtha component of the present invention will consist of at least 70% w/w, preferably at least 80% w/w, more preferably at least 90 or 95 or 98% w/w, most preferably at least 99 or 99.5 or even 99.8% w/w, of paraffinic components. By the term "paraffinic", it is meant a branched or non-branched alkane (herein also referred to as iso-paraffins and normal paraffins) or a cycloalkane. Preferably the paraffinic components are iso- and normal paraffins.

The amount of normal paraffins in the Fischer-Tropsch derived naphtha is up to 100% w/w. Preferably, the Fischer-Tropsch derived naphtha contains from 20 to 98% w/w or greater of normal paraffins.

The weight ratio of iso-paraffins to normal paraffins may suitably be greater than 0.1 and may be up to 12; suitably it is from 2 to 6. The actual value for this ratio may be determined, in part, by the hydroconversion process used to prepare the gas oil from the Fischer-Tropsch synthesis product.

The olefin content of the Fischer-Tropsch derived naphtha component of the present invention is preferably 2.0% w/w or lower, more preferably 1.0% w/w or lower, and even more preferably 0.5% w/w or lower. The aromatic content of the Fischer-Tropsch derived naphtha component of the present invention is preferably 2.0% w/w or lower, more preferably 1.0% w/w or lower, and even more preferably 0.5% w/w or lower.

The Fischer-Tropsch derived naphtha component of the present invention preferably has a density of from 0.67 to 0.73 g/cm3 at 15° C. and a sulphur content of 5 mg/kg or less, preferably 2 mg/kg or less.

It will be appreciated by the skilled person that Fischer-Tropsch derived naphtha will have a very low anti-knock index. Typically, the Research Octane Number (RON), as measured by ASTM D2699, and the Motor Octane Number (MON), as measured by ASTM D2700, of the Fischer-Tropsch derived naphtha component of the present invention will, independently, be at most 60, more typically at most 50, and commonly at most 40.

Preferably, the Fischer-Tropsch derived naphtha component of the present invention is a product prepared by a Fischer-Tropsch methane condensation reaction using a hydrogen/carbon monoxide ratio of less than 2.5, preferably less than 1.75, more preferably from 0.4 to 1.5, and ideally using a cobalt containing catalyst. Suitably, it will have been obtained from a hydrocracked Fischer-Tropsch synthesis product (for instance as described in GB-B-2077289 and/or EP-A-0147873), or more preferably a product from a two-stage hydroconversion process such as that described in EP-A-0583836 (see above). In the latter case, preferred features of the hydroconversion process may be as disclosed at pages 4 to 6, and in the examples, of EP-A-0583836.

Suitably, the Fischer-Tropsch derived naphtha component of the present invention is a product prepared by a low temperature Fischer-Tropsch process, by which is meant a process operated at a temperature of 250° C. or lower, such as from 125 to 250° C. or from 175 to 250° C., as opposed to a high temperature Fischer-Tropsch process which might typically be operated at a temperature of from 300 to 350° C.

In the liquid fuel composition herein, the Fischer-Tropsch derived naphtha component of the present invention may include a mixture of two or more Fischer-Tropsch derived naphthas.

The concentration of naphtha in the liquid fuel composition described herein is in the range of from 0.5 to 50% v/v, preferably from 10 to 50% v/v. Preferably, the concentration of the naphtha in the liquid fuel composition described herein accords with a combination of one of parameters (xi) to (xv) and one of parameters (xvi) to (xix) below:—

(xi) at least 11% v/v,
(xii) at least 12% v/v,
(xiii) at least 13% v/v,
(xiv) at least 14% v/v,
(xv) at least 15% v/v, with features (xi), (xii), (xiii), (xiv) and (xv) being progressively more preferred; and (xvi) up to 50% v/v,
(xvii) up to 40% v/v,
(xviii) up to 35% v/v,
(xix) up to 32% v/v,
(xx) up to 30% v/v, with features (xvi), (xvii), (xviii), (xix) and (xx) being progressively more preferred.

Examples of specific combinations of the above features are (xi) and (xvi), (xi) and (xvii), (xi) and (xviii), (xi) and (xix), (xi) and (xx), (xii) and (xvi), (xii) and (xvii), (xii) and (xviii), (xii) and (xix), (xii) and (xx), (xiii) and (xvi), (xiii) and (xvii), (xiii) and (xviii), (xiii) and (xix), (xiii) and (xx), (xiv) and (xvi), (xiv) and (xvii), (xiv) and (xviii), (xiv) and (xix), (xiv) and (xx), (xv) and (xvi), (xv) and (xvii), (xv) and (xviii), (xv) and (xix), and (xv) and (xx).

It will be appreciated by a person skilled in the art that the gasoline base fuel may already contain some naphtha components. The concentration of the naphtha referred to above means the concentration of naphtha which is added into the liquid fuel composition as a blend with the gasoline base fuel, and does not include the concentration of any naphtha components already present in the gasoline base fuel.

In the liquid fuel compositions of the present invention, the gasoline used as the gasoline base fuel may be any gasoline suitable for use in an internal combustion engine of the spark-ignition (petrol) type known in the art, including automotive engines as well as in other types of engine such as, for example, off road and aviation engines. The gasoline used as the base fuel in the liquid fuel composition of the present invention may conveniently also be referred to as 'base gasoline'.

The gasoline base fuel may itself comprise a mixture of two or more different gasoline fuel components, and/or be additivated as described below.

Conventionally gasoline base fuels are present in a gasoline or liquid fuel composition in a major amount, for example greater than 50% m/m of the liquid fuel composition, and may be present in an amount of up to 90% m/m, or 95% m/m, or 99% m/m, or 99.9% m/m, or 99.99% m/m, or 99.999% m/m. Suitable the liquid fuel composition contains or consists essentially of the gasoline base fuel in conjunction with 0.5 to 50% v/v of naphtha, and optionally one or more conventional gasoline fuel additives, such as specified hereinafter.

Gasolines typically comprise mixtures of hydrocarbons boiling in the range from 25 to 230° C. (EN-ISO 3405), the optimal ranges and distillation curves typically varying according to climate and season of the year. The hydrocarbons in a gasoline may be derived by any means known in the art, conveniently the hydrocarbons may be derived in any known manner from straight-run gasoline, synthetically-produced aromatic hydrocarbon mixtures, thermally or catalytically cracked hydrocarbons, hydro-cracked petroleum fractions, catalytically reformed hydrocarbons or mixtures of these.

The specific distillation curve, hydrocarbon composition, research octane number (RON) and motor octane number (MON) of the gasoline are not critical.

Conveniently, the research octane number (RON) of the gasoline base fuel may be at least 80, for instance in the range of from 80 to 110. Typically, the RON of the gasoline base fuel will be at least 90, for instance in the range of from 90 to 110. Typically, the RON of the gasoline base fuel will be at least 91, for instance in the range of from 91 to 105 (EN 25164). The motor octane number (MON) of the gasoline may conveniently be at least 70, for instance in the range of from 70 to 110. Typically, the MON of the gasoline will be at least 75, for instance in the range of from 75 to 105 (EN 25163).

As mentioned above, Fischer-Tropsch derived naphtha has a very low anti-knock index, and therefore the addition of Fischer-Tropsch derived naphtha to the gasoline base fuel will typically result in a lowering of the RON and MON of the gasoline base fuel.

The liquid fuel composition used in the present invention has a Research Octane Number (RON) of 95 or less, preferably of 93 or less, more preferably 92 or less, even more preferably 90 or less. The liquid fuel composition used in the present invention has a Motor Octane Number in the range of from 75 to 90.

Typically, gasolines comprise components selected from one or more of the following groups; saturated hydrocarbons, olefinic hydrocarbons, aromatic hydrocarbons, and oxygenated hydrocarbons. Conveniently, the gasoline may comprise a mixture of saturated hydrocarbons, olefinic hydrocarbons, aromatic hydrocarbons, and, optionally, oxygenated hydrocarbons.

Typically, the olefinic hydrocarbon content of the gasoline is in the range of from 0 to 40% v/v based on the gasoline (ASTM D1319); preferably, the olefinic hydrocarbon content of the gasoline is in the range of from 0 to 30% v/v based on the gasoline, more preferably, the olefinic hydrocarbon content of the gasoline is in the range of from 0 to 20% v/v based on the gasoline.

Typically, the aromatic hydrocarbon content of the gasoline is in the range of from 0 to 70% v/v based on the gasoline (ASTM D1319), for instance the aromatic hydrocarbon content of the gasoline is in the range of from 10 to 60% v/v based on the gasoline; preferably, the aromatic hydrocarbon content of the gasoline is in the range of from 0 to 50% v/v based on the gasoline, for instance the aromatic hydrocarbon content of the gasoline is in the range of from 10 to 50% v/v based on the gasoline.

The benzene content of the gasoline is at most 10% v/v, more preferably at most 5% v/v, especially at most 1% v/v based on the gasoline.

The gasoline preferably has a low or ultra low sulphur content, for instance at most 1000 mg/kg (otherwise known as ppm or ppmw or parts per million by weight), preferably no more than 500 mg/kg, more preferably no more than 100, even more preferably no more than 50 and most preferably no more than even 10 mg/kg.

The gasoline also preferably has a low total lead content, such as at most 0.005 g/l, most preferably being lead free—having no lead compounds added thereto (i.e., unleaded).

When the gasoline comprises oxygenated hydrocarbons, at least a portion of non-oxygenated hydrocarbons will be substituted for oxygenated hydrocarbons.

Examples of oxygenated hydrocarbons that may be incorporated into the gasoline include alcohols, ethers, esters, ketones, aldehydes, carboxylic acids and their derivatives, and oxygen containing heterocyclic compounds. Preferably, the oxygenated hydrocarbons that may be incorporated into the gasoline are selected from alcohols (such as methanol, ethanol, propanol, 2-propanol, butanol, tert-butanol, iso-butanol and 2-butanol), ethers (preferably ethers containing 5 or more carbon atoms per molecule, e.g., methyl tert-butyl ether and ethyl tert-butyl ether) and esters (preferably esters containing 5 or more carbon atoms per molecule); a particularly preferred oxygenated hydrocarbon is ethanol.

When oxygenated hydrocarbons are present in the gasoline, the amount of oxygenated hydrocarbons in the gasoline may vary over a wide range.

Examples of suitable gasolines include gasolines which have an olefinic hydrocarbon content of from 0 to 20% v/v (ASTM D1319), an oxygen content of from 0 to 5% m/m (EN 1601), an aromatic hydrocarbon content of from 0 to 50% v/v (ASTM D1319) and a benzene content of at most 1% v/v.

Also suitable for use herein are gasoline blending components which can be derived from a biological source. Examples of such gasoline blending components can be found in WO2009/077606, WO2010/028206, WO2010/000761, European patent application nos. 09160983.4, 09176879.6, 09180904.6, and U.S. patent application Ser. No. 61/312,307.

Whilst not critical to the present invention, the base gasoline or the gasoline composition of the present invention may conveniently include one or more optional fuel additives, in addition to the essential one or more organic UV filter compounds mentioned above. The concentration and nature of the optional fuel additive(s) that may be included in the base gasoline or the gasoline composition of the present invention is not critical. Non-limiting examples of suitable types of fuel additives that can be included in the base gasoline or the gasoline composition of the present invention include antioxidants, corrosion inhibitors, detergents, dehazers, antiknock additives, metal deactivators, valve-seat recession protectant compounds, dyes, solvents, carrier fluids, diluents and markers. Examples of suitable such additives are described generally in U.S. Pat. No. 5,855,629.

Conveniently, the fuel additives can be blended with one or more solvents to form an additive concentrate, the additive concentrate can then be admixed with the base gasoline or the gasoline composition of the present invention.

The (active matter) concentration of any optional additives present in the base gasoline or the gasoline composition of the present invention is preferably up to 1% m/m, more preferably in the range from 5 to 2000 mg/kg, advantageously in the range of from 300 to 1500 mg/kg, such as from 300 to 1000 mg/kg.

As stated above, the gasoline composition may also contain synthetic or mineral carrier oils and/or solvents.

Examples of suitable mineral carrier oils are fractions obtained in crude oil processing, such as brightstock or base oils having viscosities, for example, from the SN 500-2000 class; and also aromatic hydrocarbons, paraffinic hydrocarbons and alkoxyalkanols. Also useful as a mineral carrier oil is a fraction which is obtained in the refining of mineral oil and is known as "hydrocrack oil" (vacuum distillate cut having a boiling range of from about 360 to 500° C., obtainable from natural mineral oil which has been catalytically hydrogenated under high pressure and isomerized and also deparaffinized).

Examples of suitable synthetic carrier oils are: polyolefins (poly-alpha-olefins or poly (internal olefin)s), (poly)esters, (poly)alkoxylates, polyethers, aliphatic polyether amines, alkylphenol-started polyethers, alkylphenol-started polyether amines and carboxylic esters of long-chain alkanols.

Examples of suitable polyolefins are olefin polymers, in particular based on polybutene or polyisobutene (hydrogenated or nonhydrogenated).

Examples of suitable polyethers or polyetheramines are preferably compounds comprising polyoxy-$C_2$-$C_4$-alkylene moieties which are obtainable by reacting $C_2$-$C_{60}$-alkanols, $C_6$-$C_{30}$-alkanediols, mono- or di-$C_2$-$C_{30}$-alkylamines, $C_1$-$C_{30}$-alkylcyclohexanols or $C_1$-$C_{30}$-alkylphenols with from 1 to 30 mol of ethylene oxide and/or propylene oxide and/or butylene oxide per hydroxyl group or amino group, and, in the case of the polyether amines, by subsequent reductive amination with ammonia, monoamines or polyamines. Such products are described in particular in EP-A-310 875, EP-A-356 725, EP-A-700 985 and U.S. Pat. No. 4,877,416. For example, the polyether amines used may be poly-$C_2$-$C_6$-alkylene oxide amines or functional derivatives thereof. Typical examples thereof are tridecanol butoxylates or isotridecanol butoxylates, isononylphenol butoxylates and also polyisobutenol butoxylates and propoxylates, and also the corresponding reaction products with ammonia.

Examples of carboxylic esters of long-chain alkanols are in particular esters of mono-, di- or tricarboxylic acids with long-chain alkanols or polyols, as described in particular in DE-A-38 38 918. The mono-, di- or tricarboxylic acids used may be aliphatic or aromatic acids; suitable ester alcohols or polyols are in particular long-chain representatives having, for example, from 6 to 24 carbon atoms. Typical representatives of the esters are adipates, phthalates, isophthalates, terephthalates and trimellitates of isooctanol, isononanol, isodecanol and isotridecanol, for example di-(n- or isotridecyl) phthalate.

Further suitable carrier oil systems are described, for example, in DE-A-38 26 608, DE-A-41 42 241, DE-A-43 09

074, EP-A-0 452 328 and EP-A-0 548 617, which are incorporated herein by way of reference.

Examples of particularly suitable synthetic carrier oils are alcohol-started polyethers having from about 5 to 35, for example from about 5 to 30, $C_3$-$C_6$-alkylene oxide units, for example selected from propylene oxide, n-butylene oxide and isobutylene oxide units, or mixtures thereof. Non-limiting examples of suitable starter alcohols are long-chain alkanols or phenols substituted by long-chain alkyl in which the long-chain alkyl radical is in particular a straight-chain or branched $C_6$-$C_{18}$-alkyl radical. Preferred examples include tridecanol and nonylphenol.

Further suitable synthetic carrier oils are alkoxylated alkylphenols, as described in DE-A-10 102 913.6.

Mixtures of mineral carrier oils, synthetic carrier oils, and mineral and synthetic carrier oils may also be used.

Any solvent and optionally co-solvent suitable for use in fuels may be used. Examples of suitable solvents for use in fuels include: non-polar hydrocarbon solvents such as kerosene, heavy aromatic solvent ("solvent naphtha heavy", "Solvesso 150"), toluene, xylene, paraffins, petroleum, white spirits, those sold by Shell companies under the trademark "SHELLSOL", and the like. Examples of suitable co-solvents include: polar solvents such as esters and, in particular, alcohols (e.g., t-butanol, i-butanol, hexanol, 2-ethylhexanol, 2-propyl heptanol, decanol, isotridecanol, butyl glycols, and alcohol mixtures such as those sold by Shell companies under the trade mark "LINEVOL", especially LINEVOL 79 alcohol which is a mixture of $C_{7-9}$ primary alcohols, or a $C_{12-14}$ alcohol mixture which is commercially available).

Dehazers/demulsifiers suitable for use in liquid fuels are well known in the art. Non-limiting examples include glycol oxyalkylate polyol blends (such as sold under the trade designation TOLAD™ 9312), alkoxylated phenol formaldehyde polymers, phenol/formaldehyde or $C_{1-18}$ alkylphenol/-formaldehyde resin oxyalkylates modified by oxyalkylation with $C_{1-18}$ epoxides and diepoxides (such as sold under the trade designation TOLAD™ 9308), and $C_{1-4}$ epoxide copolymers cross-linked with diepoxides, diacids, diesters, diols, diacrylates, dimethacrylates or diisocyanates, and blends thereof. The glycol oxyalkylate polyol blends may be polyols oxyalkylated with $C_{1-4}$ epoxides. The $C_{1-18}$ alkylphenol phenol/-formaldehyde resin oxyalkylates modified by oxyalkylation with $C_{1-18}$ epoxides and diepoxides may be based on, for example, cresol, t-butyl phenol, dodecyl phenol or dinonyl phenol, or a mixture of phenols (such as a mixture of t-butyl phenol and nonyl phenol). The dehazer should be used in an amount sufficient to inhibit the hazing that might otherwise occur when the gasoline without the dehazer contacts water, and this amount will be referred to herein as a "haze-inhibiting amount." Generally, this amount is from about 0.1 to about 20 mg/kg (e.g., from about 0.1 to about 10 mg/kg), more preferably from 1 to 15 mg/kg, still more preferably from 1 to 10 mg/kg, advantageously from 1 to 5 mg/kg based on the weight of the gasoline.

Further customary additives for use in gasolines are corrosion inhibitors, for example based on ammonium salts of organic carboxylic acids, said salts tending to form films, or of heterocyclic aromatics for nonferrous metal corrosion protection; antioxidants or stabilizers, for example based on amines such as phenyldiamines, e.g., p-phenylenediamine, N,N'-di-sec-butyl-p-phenyldiamine, dicyclohexylamine or derivatives thereof or of phenols such as 2,4-di-tert-butylphenol or 3,5-di-tert-butyl-4-hydroxy-phenylpropionic acid; anti-static agents; metallocenes such as ferrocene; methylcyclo-pentadienylmanganese tricarbonyl; lubricity additives, such as certain fatty acids, alkenylsuccinic esters, bis(hydroxyalkyl) fatty amines, hydroxyacetamides or castor oil; and also dyes (markers). Amines may also be added, if appropriate, for example as described in WO03/076554. Optionally anti-valve seat recession additives may be used such as sodium or potassium salts of polymeric organic acids.

The gasoline compositions herein may contain one or more organic sunscreen or UV filter compounds. There is no particular limitation on the type of organic sunscreen or UV filter compound which can be used in the gasoline compositions of the present invention as long as it is suitable for use in a gasoline composition.

A wide variety of conventional organic sunscreen actives are suitable for use herein. Sagarin, et al., at Chapter VIII, pages 189 et seq., of Cosmetics Science and Technology (1972), discloses numerous suitable actives.

Particularly preferred hydrophobic organic sunscreen actives useful in the composition of the present invention include: (i) alkyl β,β-diphenylacrylate and/or alpha-cyano-beta,beta-diphenylacrylate derivatives; (ii) salicylic derivatives; (iii) cinnamic derivatives; (iv) dibenzoylmethane derivatives; (v) camphor derivatives; (vi) benzophenone derivatives; (vii) p-aminobenzoic acid derivatives; and (viii) phenalkyl benzoate derivatives; and mixtures thereof.

The amount of the one or more organic sunscreen/UV filter compounds in the gasoline composition is preferably at most 2% m/m, by weight of the liquid fuel composition. The total level of the one or more organic sunscreen/UV filter compounds is preferably at least 10 mg/kg, by weight of the liquid fuel composition. The total level of the one or more organic sunscreen/UV filter compounds is more preferably in the range of from 1 to 0.005% m/m, more preferably in the range of from 0.5 to 0.01% m/m, even more preferably in the range of from 0.05% to 0.01% m/m, by weight of the liquid fuel composition.

The following types of organic UV sunscreen compounds are also suitable for use herein, in combination with the oxanilide compound(s): imidazoles, triazines, triazones and triazoles, and mixtures thereof.

Also suitable for use herein is one or more organic UV filter compounds selected from oxanilide compounds.

The gasoline compositions herein can also comprise a detergent additive. Suitable detergent additives include those disclosed in WO2009/50287, incorporated herein by reference.

Preferred detergent additives for use in the gasoline composition herein typically have at least one hydrophobic hydrocarbon radical having a number-average molecular weight (Mn) of from 85 to 20 000 and at least one polar moiety selected from:

(A1) mono- or polyamino groups having up to 6 nitrogen atoms, of which at least one nitrogen atom has basic properties;

(A6) polyoxy-$C_2$- to -$C_4$-alkylene groups which are terminated by hydroxyl groups, mono- or polyamino groups, in which at least one nitrogen atom has basic properties, or by carbamate groups;

(A8) moieties derived from succinic anhydride and having hydroxyl and/or amino and/or amido and/or imido groups; and/or (A9) moieties obtained by Mannich reaction of substituted phenols with aldehydes and mono- or polyamines.

The hydrophobic hydrocarbon radical in the above detergent additives, which ensures the adequate solubility in the base fluid, has a number-average molecular weight (Mn) of from 85 to 20 000, especially from 113 to 10 000, in particular from 300 to 5000. Typical hydrophobic hydrocarbon radicals, especially in conjunction with the polar moieties (A1), (A8) and (A9), include polyalkenes (polyolefins), such as the polypropenyl, polybutenyl and polyisobutenyl radicals each having Mn of from 300 to 5000, preferably from 500 to 2500, more preferably from 700 to 2300, and especially from 700 to 1000.

Non-limiting examples of the above groups of detergent additives include the following:

Additives comprising mono- or polyamino groups (A1) are preferably polyalkenemono- or polyalkenepolyamines based on polypropene or conventional (i.e., having predominantly internal double bonds) polybutene or polyisobutene having Mn of from 300 to 5000. When polybutene or polyisobutene having predominantly internal double bonds (usually in the beta and gamma position) are used as starting materials in the preparation of the additives, a possible preparative route is by chlorination and subsequent amination or by oxidation of the double bond with air or ozone to give the carbonyl or carboxyl compound and subsequent amination under reductive (hydrogenating) conditions. The amines used here for the amination may be, for example, ammonia, monoamines or polyamines, such as dimethylaminopropylamine, ethylenediamine, diethylenetriamine, triethylenetetramine or tetraethylenepentamine. Corresponding additives based on polypropene are described in particular in WO-A-94/24231.

Further preferred additives comprising monoamino groups (A1) are the hydrogenation products of the reaction products of polyisobutenes having an average degree of polymerization of from 5 to 100, with nitrogen oxides or mixtures of nitrogen oxides and oxygen, as described in particular in WO-A-97/03946.

Further preferred additives comprising monoamino groups (A1) are the compounds obtainable from polyisobutene epoxides by reaction with amines and subsequent dehydration and reduction of the amino alcohols, as described in particular in DE-A-196 20 262.

Additives comprising polyoxy-$C_2$-$C_4$-alkylene moieties (A6) are preferably polyethers or polyetheramines which are obtainable by reaction of $C_2$- to $C_{60}$-alkanols, $C_6$- to $C_{30}$-alkanediols, mono- or di-$C_2$-$C_{30}$-alkylamines, $C_1$-$C_{30}$-alkylcyclohexanols or $C_1$-$C_{30}$-alkylphenols with from 1 to 30 mol of ethylene oxide and/or propylene oxide and/or butylene oxide per hydroxyl group or amino group and, in the case of the polyether-amines, by subsequent reductive amination with ammonia, monoamines or polyamines. Such products are described in particular in EP-A-310 875, EP-A-356 725, EP-A-700 985 and U.S. Pat. No. 4,877,416. In the case of polyethers, such products also have carrier oil properties. Typical examples of these are tridecanol butoxylates, isotridecanol butoxylates, isononylphenol butoxylates and polyisobutenol butoxylates and propoxylates and also the corresponding reaction products with ammonia.

Additives comprising moieties derived from succinic anhydride and having hydroxyl and/or amino and/or amido and/or imido groups (A8) are preferably corresponding derivatives of polyisobutenylsuccinic anhydride which are obtainable by reacting conventional or highly reactive polyisobutene having Mn of from 300 to 5000 with maleic anhydride by a thermal route or via the chlorinated polyisobutene. Of particular interest are derivatives with aliphatic polyamines such as ethylenediamine, diethylenetriamine, triethylenetetramine or tetraethylenepentamine. Such additives are described in particular in U.S. Pat. No. 4,849,572.

Additives comprising moieties obtained by Mannich reaction of substituted phenols with aldehydes and mono- or polyamines (A9) are preferably reaction products of polyisobutene-substituted phenols with formaldehyde and mono- or polyamines such as ethylenediamine, diethylenetriamine, triethylenetetramine, tetraethylenepentamine or dimethylaminopropylamine. The polyisobutenyl-substituted phenols may stem from conventional or highly reactive polyisobutene having Mn of from 300 to 5000. Such "polyisobutene-Mannich bases" are described in particular in EP-A-831 141.

Preferably, the detergent additive used in the gasoline compositions of the present invention contains at least one nitrogen-containing detergent, more preferably at least one nitrogen-containing detergent containing a hydrophobic hydrocarbon radical having a number average molecular weight in the range of from 300 to 5000. Preferably, the nitrogen-containing detergent is selected from a group comprising polyalkene monoamines, polyetheramines, polyalkene Mannich amines and polyalkene succinimides. Conveniently, the nitrogen-containing detergent may be a polyalkene monoamine.

In the above, amounts (concentrations, % v/v, mg/kg (ppm), % m/m) of components are of active matter, i.e., exclusive of volatile solvents/diluent materials.

The liquid fuel composition of the present invention can be produced by admixing the naphtha with a gasoline base fuel suitable for use in an internal combustion engine. Since the base fuel to which the naphtha is admixed is a gasoline, then the liquid fuel composition produced is a gasoline composition.

It has surprisingly been found that the use of 0.5 to 50% v/v of naphtha, particular of Fischer-Tropsch derived naphtha, in liquid fuel compositions provides benefits in terms of improved fuel consumption, in a spark ignition internal combustion engine, particularly wherein the spark ignition internal combustion engine is comprised within the powertrain of a hybrid electric vehicle, in particular a plug-in hybrid electric vehicle.

FIG. 1 is a schematic diagram of a plug-in hybrid electric vehicle (PHEV) 100. The PHEV 100 is a type of in hybrid electric vehicle (HEV) that makes use of both electrical energy stored in a battery 102 charged during driving operations by an internal combustion engine (ICE) 104 and mechanical energy converted from fuel via the ICE 104. The PHEV 100 provides the additional benefit of charging the battery 102 via a plug 106 (i.e., electrically connected with the battery 102) while the PHEV 100 is parked. The ICE 104 can include a spark ignition internal combustion engine that is comprised within a powertrain 108 of the PHEV 100. A conventional fuel source 110 supplies fuel via line 112 to a fuel tank 114 where the fuel is used to operate the ICE 104. The fuel via line 112 of the present invention comprises (a) a gasoline base fuel and (b) from 0.5 to 50% v/v of naphtha. The battery 104 stores energy and provides electric power to a motor 116. The motor 116, in turn, converts the electrical energy to mechanical power to move wheels 118 of the PHEV 100. Additionally, the ICE 104 provides mechanical power generated by the fuel via line 112 to move the PHEV 100 via the wheels 118. In this regard, the battery 102, engine 104, or both may provide power to move the wheels 118 so as to operate the PHEV 100.

The invention is further described by reference to the following non-limiting example.

EXAMPLE

The present Example tests cold starting ability, power output performance, $CO_2$ emissions and fuel consumption in a PHEV compared to a conventional ICE vehicle. The Examples use standard EN 228 compliant gasoline (Comparison—Fuel A) versus a test gasoline composition (Experiment—Fuel B). The properties of the Comparison and Experiment fuels are set out in Table 1.

TABLE 1

| Fuel Properties | | | | | |
|---|---|---|---|---|---|
| | | EN228 Specification | | Comparison | Experiment |
| | | Min | Max | Fuel A | Fuel B |
| RON | — | 95 | — | 96.5 | 91.3 |
| MON | — | 85 | — | 85.4 | 82.6 |
| Density @ 15° C. | g/cm$^3$ | 0.720 | 0.775 | 0.7390 | 0.7537 |
| IBP | ° C. | — | — | 26.0 | 23.8 |
| FBP | ° C. | — | 210.0 | 200.9 | 199.0 |
| E70 | % vol | 20.0 | 48.0 | 33.5 | 30.9 |
| E100 | % vol | 46.0 | 71.0 | 52.9 | 51.4 |
| E150 | % vol | 75.0 | — | 84.9 | 87.8 |
| VP | kPa | 45.0 | 110.0 | 94.9 | 84.7 |
| GC | | | | | |
| C | — | — | — | 6.48 | 6.52 |
| H | — | — | — | 11.64 | 12.04 |
| O | — | — | — | 0.00 | 0.00 |
| C | % m | — | — | 87.00 | 86.66 |
| H | % m | — | — | 13.02 | 13.34 |
| O | % m | — | 2.7 or 3.7 | 0.00 | 0.00 |
| Paraffins | % vol | — | — | 12.28 | 15.81 |
| Isoparaffins | % vol | — | — | 33.52 | 33.66 |
| Olefins (incl. dienes) | % vol | — | — | 15.21 | 13.74 |
| Dienes | % vol | — | — | 0.13 | 0.12 |
| Naphthenes | % vol | — | — | 3.07 | 4.78 |
| Aromatics | % vol | — | — | 34.62 | 30.58 |
| Oxygenates | % vol | — | — | 0.00 | 0.00 |
| Unknowns | % vol | — | — | 1.30 | 1.43 |
| Total | % vol | — | — | 100.0 | 100.0 |
| AFR (stoich) | — | — | — | 14.46 | 14.53 |
| Gr. Ent. Com (g) | MJ/kg | — | — | −43.30 | −42.489 |
| Vol. Ent. Com. (g) | MJ/L | — | — | −31.9987 | −31.9949 |
| Gr. Ent. Com. (l) | MJ/kg | — | — | −43.000 | −43.118 |
| Vol. Ent. Com. (l) | MJ/L | — | — | −31.777 | −31.7219 |
| Heat of vaporisation | MJ/kg | — | — | 0.371 | 0.37 |
| Cal. H/C ratio | — | — | — | 1.796 | 1.85 |
| Cal. O/C ratio | — | — | — | 0.000 | 0.000 |
| CWF | — | — | — | 0.8690 | 0.8658 |

The reference fuel (Fuel A) was a standard unleaded gasoline with an octane quality of RON 96.5 that met the current EN228 specification and was similar to a conventional main grade gasoline fuel. This fuel acted as the baseline for comparison. The Experiment fuel (Fuel B) was a blend of reference fuel (Fuel A) with 10% GTL naphtha. It had a low octane quality of RON 91.3 and both its RON and MON were below the current EN228 specification, otherwise it met it.

Vehicles

A 2008 Toyota Prius 1.5 T4 HEV that was converted by Amberjac © to have plug-in charging capability was selected for test as a representative PHEV. This was compared to a standard 2004 Volkswagen Golf 1.6 FSI powered by conventional spark ignition, direct fuel injection, internal combustion engine (ICE) technology. The ICEs in both vehicles operated using a four-stroke cycle with variable valve timing.

Performance Assessment

An important consideration for fuel formulations is the potential for any fuel derived performance benefits or demerits. These are most often determined by operating the vehicle (or engine) at full load during accelerating and/or steady conditions. Fuel A and Fuel B were subjected to power performance testing. The conditions for assessing the power output are set out in Table 2.

TABLE 2

| Performance Testing | |
|---|---|
| Test | Definition |
| Warm up | 100 km/h, road load simulation, 15 min, Tank Fuel |
| Select Fuel | Connect test fuel to external fuel lines |
| Purge/Precon | Cruise, Drive or Top Gear-1, 90 km/h, road-load, 15 min<br>5× Wide open throttle (WOT) Acceleration in Drive or Top Gear-1, 50-100 km/h |
| Power Test | Wide open throttle (WOT) at 50, 80, 120 km/h in Drive Mode or Top Gear-1:<br>5 s stabilisation, 5 s measurement<br>Pause: 60 s idle<br>Repeat twice (three measurements at each step)<br>Measurements made: Power (kW), Tractive Force (N), Speed (km/h dynamometer) |

Measuring $CO_2$ Emissions and Fuel Consumption Over NEDC

Both vehicles were used for the $CO_2$ emissions and fuel consumption test which was conducted on a four-wheel drive chassis dynamometer at a test temperature of 5° C. A standard NEDC (New European Driving Cycle) was used for the emissions measurements. Fuel consumption was calculated using the carbon balance method, which is based on the simple principle of carbon mass continuity through the engine and exhaust system. Hence totalling the measured carbon content of the exhaust gases (CO, $CO_2$ and total unburned hydrocarbon) and comparing this with the carbon present in the fuel used at the time leading to an accurate determination of fuel consumption. Modern vehicles are equipped with exhaust after-treatment systems that are designed to convert hydrocarbon material in the exhaust into additional water and $CO_2$. Fuel consumption is therefore generally regarded as being strongly correlated with $CO_2$ emissions.

The following table (Table 3) outlines the results for cold start New European Driving Cycle (NEDC) alongside a notional prediction based upon the common general knowledge before the tests were run.

TABLE 3

| | Fuel consumption compared to Fuel A | |
|---|---|---|
| | PHEV | ICE |
| Prediction | Worse, because of the low octane quality of Fuel B | Worse, because of the low octane quality of Fuel B |
| Result NEDC | Better by 2.9% | Better by 0.6% |

The results for % benefit for power output for Fuel B compared to Fuel A are shown in Table 4 below alongside a notional prediction based upon the common general knowledge before the tests were run.

TABLE 4

| | Power output compared to Fuel A | |
|---|---|---|
| Fuel B | PHEV | ICE |
| Prediction | Worse, because of the low octane quality of Fuel B | Worse, because of the low octane quality of Fuel B |
| Result max power at 50 km/h | Better by 16.3%* | Worse by 8.3%* |
| Result max power at 120 km/h | Better by 13.1%* | Worse by 5.0%* |

*average value for 2 measurements

DISCUSSION

Surprisingly, it was found that Fuel B, despite its low octane quality, was consumed at a lower rate than Fuel A in both cars.

In particular, the results in Table 3 show that using a low octane quality, Fischer-Tropsch naphtha containing fuel, showed benefits in fuel economy, particularly in the PHEV vehicle. Hence, the invention provides for utilisation of fuels containing naphtha, especially GTL naphtha, having low octane quality, in ICEs in general, and more suitably within ICEs comprised within the powertrain of a hybrid electric vehicle.

The results in Table 4 show that Fuel B shows a benefit in power output compared to Fuel A in the hybrid electric vehicle. This benefit is surprising in view of the low octane quality of Fuel B.

Although particular embodiments of the invention have been disclosed herein in detail, this has been done by way of example and for the purposes of illustration only. The aforementioned embodiments are not intended to be limiting with respect to the scope of the appended claims. It is contemplated by the inventors that various substitutions, alterations, and modifications may be made to the invention without departing from the spirit and scope of the invention as defined by the claims.

That which is claimed:

1. A method of operating a spark ignition internal combustion engine wherein the spark ignition internal combustion engine is comprised within the powertrain of a hybrid electric vehicle, comprising operating the spark ignition internal combustion engine using a liquid fuel composition comprising (a) from at least 50% m/m of a gasoline base fuel and (b) from 0.5 to 50% v/v of naphtha, wherein the hybrid electric vehicle is a plug-in hybrid electric vehicle.

2. The method of claim 1 wherein the naphtha is Fischer-Tropsch derived naphtha.

3. The method of claim 1 wherein the liquid fuel composition is a gasoline.

4. The method of claim 1 wherein the liquid fuel composition has a Research Octane Number (RON) of 95 or less.

5. The method of claim 1 wherein the liquid fuel composition has a Research Octane Number (RON) of 93 or less.

6. The method of claim 1 wherein the liquid fuel composition comprises from 10 to 50% v/v naphtha.

7. A method of improving the fuel consumption in a spark ignition internal combustion engine comprising operating the spark ignition internal combustion engine using a liquid fuel composition comprising (a) from at least 50% m/m of a gasoline base fuel and (b) from 0.5 to 50% v/v of naphtha, wherein the spark ignition internal combustion engine is comprised within the powertrain of a plug-in hybrid electric vehicle.

8. The method of claim 7 wherein the naphtha is Fischer-Tropsch derived naphtha.

9. A method of improving power output in a spark ignition internal combustion engine comprising operating the spark ignition internal combustion engine using a liquid fuel composition comprising (a) from at least 50% m/m of a gasoline base fuel and (b) from 0.5 to 50% v/v of naphtha, wherein the spark ignition internal combustion engine is comprised within the powertrain of a plug-in hybrid electric vehicle.

10. The method of claim 9 wherein the naphtha is Fischer-Tropsch derived naphtha.

* * * * *